US006351096B1

(12) United States Patent
Jang

(10) Patent No.: US 6,351,096 B1
(45) Date of Patent: Feb. 26, 2002

(54) OPERATION CONTROL APPARATUS FOR ESCALATOR

(75) Inventor: Cheol Ho Jang, Changwon (KR)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/559,578

(22) Filed: Apr. 28, 2000

(30) Foreign Application Priority Data

Apr. 30, 1999 (KR) .......................................... 99-15650

(51) Int. Cl.[7] ............................ H02P 5/28; H02P 5/34; H02P 5/38; H02P 5/408; H02P 7/36

(52) U.S. Cl. ....................... 318/811; 318/799; 318/599; 318/611; 198/322; 187/292

(58) Field of Search ................................ 318/811, 798, 318/802, 806, 599, 611, 448, 609, 610; 198/323, 322, 321; 187/292

(56) References Cited

U.S. PATENT DOCUMENTS 5,428,285 A * 6/1995 Koyama et al. ............ 318/799
5,824,975 A * 10/1998 Hong ......................... 187/292
5,959,266 A * 9/1999 Uchiumi ..................... 187/292
6,089,355 A * 7/2000 Seki et al. .................. 187/292

FOREIGN PATENT DOCUMENTS

JP 01259785 A * 10/1989 ................. 318/799

* cited by examiner

*Primary Examiner*—Robert E. Nappi
*Assistant Examiner*—Edgardo San Martin
(74) *Attorney, Agent, or Firm*—Birch, Stewart, Kolasch & Birch, LLP

(57) ABSTRACT

The present invention relates to a technique for outputting a vibration torque compensating current and removing a torque pulse generated at a footplate by using a detector for detecting a pulse rate generated at a sprocket and a device for detecting the magnitude of a pulse torque of an induction motor without changing the circumferential shape of the sprocket and the connecting structure of the footplate. To achieve the object of the invention, there is provided an operation control apparatus for an escalator which includes a power rectifier for converting a three-phase AC utility power into an AC power of variable voltage and variable frequency in order to control the operation speed of the escalator, a gear and a sprocket for running a footplate using rotatory force generated from the induction motor, a position detection for detecting the rotational position of the sprocket, and a control device for generating a vibration torque compensating current Irc in order to generated a torque in the direction opposite to an actual vibration torque according to the actual rotational speed Wr of the induction motor and the output signal of the position detector, in generating a pulse width modulation signal in order to control the driving of the power rectifier.

10 Claims, 10 Drawing Sheets

OPERATION CONTROL APPARATUS FOR ESCALATOR

BACKGROUND OF THE INVENTION

1. Field of the Invention

The present invention relates to an operation control technique for improving the ride comfort of an escalator, and in particular, to an operation control apparatus for an escalator which is capable of suppressing running vibration due to a footplate by using a vibration-damping control compensator.

In the escalator, an automatic operation means an operation mode for stopping an operation when no passenger intending to use the escalator, in order to save energy and broaden the product's life time. For this, there is provided a detection device for detecting the entrance and passage of a passenger. When the entrance of a passenger is detected, the escalator is operated at a constant acceleration, and then when a passenger reaches the point of entrance to a step, the escalator is operated at a nominal speed thereafter. With the lapse of certain amount of time since the last passenger's passing by the escalator, the operation of the escalator is stopped.

In order to perform the above automatic operation, an inverter having a power rectifier is usually employed. In addition, a power transmission device for the movement of the footplate of the escalator is constructed in such a way that a machine shaft having an induction motor and a gear is connected with a shaft of a sprocket having a terminal gear by a chain, to thereby rotate the sprocket. That is, a groove of semi-circumferential shape is formed at the circumferential portion of the sprocket, which is rotated, being engaged with a roller connected to a lower portion of the footplate. When they are engaged with each other, imbalance of torque occurs to thereby generate vibration, which vibration is transmitted to the footplate, thus decreasing the ride comfort.

The present invention is intended to remove electric components sensed on the footplate by detecting a position at which the roller and the sprocket are engaged using a position sensor attached on the shaft of the sprocket, inputting a detection signal thereof to the control apparatus, extracting a pulse component of the torque by a speed detector installed at the shaft of the induction motor, and then applying a torque whose magnitude and phase are opposite to the above torque to the induction motor.

2. Description of the Background Art

FIG. 1 is a block diagram of an operation control apparatus for an escalator in accordance with the conventional art. As illustrated therein, an operation control apparatus for the escalator includes: a power rectifier 2 for converting a three-phase AC utility power into an AC power of variable voltage and variable frequency in order to control the operation speed of the escalator; an induction motor 3 which is driven by output power of the power rectifier; a gear 4 and a sprocket for running a footplate using rotatory force generated from the induction motor 3; a current detector 6 for detecting a current flowing in the induction motor 3; an electromagnetic contactor 7 for transmitting the utility power to the power rectifier 2 in an operation mode and interrupting the same in a non-operation mode; a display device 8 for displaying a running condition and failure of the escalator; a passenger detecting device 9 for detecting an access of a passenger intending to use the escalator; and a control device 10 for appropriately controlling the driving of the induction motor 3 by the power rectifier 2, for thereby operating the escalator at a target speed.

The control device 10 includes: a CPU 11 for performing an operation for driving the induction motor 3 at a variable voltage and variable frequency according to a program stored in a ROM 12; a RAM 13 in which data needed in the CPU 11 is stored; an input device 14 for a signal inputted from the current detector 6, the passenger detecting device 9 and a rotational speed detector 20 into an appropriate form; an output device 15 for driving the display device 8 and the electromagnetic contactor 7 under the control of the CPU 11; a failure detection device 16 for detecting a failure on the basis of an output signal of the input device 14 and an operation pattern setting device 17 for setting a subsequent operation pattern; a pulse width modulation signal generator 18 for generating a pulse width modulation signal according to a signal of the CPU 11 in order to generate an AC power of target form from the power rectifier 2. The operation of the control device 10 will be explained in detail with reference to FIGS. 2 and 5.

When a passenger intending to use the escalator approaches to the entry of the escalator in a state in which the operation of the escalator is stopped, the approach is detected by the passenger detection device 9 and a signal thereof is inputted into the input device 14 of the control device 10. At this time, the CPU 11 performs the operation for driving the induction motor 3 at a variable voltage and variable frequency and operates the electromagnetic contactor 7 according to the program stored in the ROM 12. According to this, an a contact switch 7A of the electromagnetic contactor 7 is short-circuited and thus the three-phase AC utility power 1 is inputted into the power rectifier 2. In addition, the pulse width modulation signal generator 18 generates a pulse width modulation signal corresponding to the operation result of the CPU 11, and accordingly the power rectifier 2 converts the three-phase AC utility power 1 supplied by the a contact switch 7A into a DC voltage and then generates an AC of variable voltage and variable frequency in order to control the torque corresponding to the target speed and load of the induction motor 3, whereby the induction motor 3 is rotated at the corresponding speed. The rotatory force of the induction motor 3 is transmitted to the sprocket 5 through the gear 4 and the chain, and thus the groove positioned on the circumference of the sprocket 5 and the step roller of the footplate are engaged to thereby be rotated. By this, the passenger can move up to a target story using the escalator.

Thereafter, when the absence of a passenger is detected by the passenger detecting device 9, the CPU 11 slows down the escalator according to the automatic operation program stored in the ROM 12 to thus stop it. According to circumstances, a low speed idle operation is performed without stopping the escalator in order to prevent a failure confusion phenomenon. In this state, when the presence of a passenger is detected by the passenger detecting device 9, the escalator is operated at a normal speed by the above process.

Meanwhile, FIG. 3 is a functional block diagram illustrating the inverter control process of the power rectifier 2 in order for the CPU 11 of the control device 10 to control the rotational speed of the induction motor according to the program stored in the ROM 12. The difference between a speed command value Wr* of a speed command unit 11A and an actually detected speed value Wr is obtained by a substractor 11B and then is inputted to a speed controller 11C, and the difference between an output current I* of the speed controller 11C and an actual current value I of the induction motor 3 detected by the current detector 6 is obtained by a substractor 11D and then is inputted to a current controller 11E. Herein, the inverter of the power rectifier 2 is driven by the output value amplified by a predetermined operational process, and thus an induction motor 11F is rotated at a predetermined speed Nr.

FIG. 4 is a signal flow chart illustrating the inverter control process of the power rectifier in accordance with the conventional art, which will be described in detail as follows.

First, it is determined whether or not there is an inverter operation command in S1. If there is an operation command, it is determined whether or not t is a speed control period in S2. If so, a motor speed value Wr is inputted in S3, a speed controller is operated in S4, and then it is determined whether or not t is a current control period in S5. Meanwhile, if there is no operation command in S1, the routine is terminated. In addition, if t is not a current control period in S4, the routine returns to S5. It is determined whether or not t is a current control period in S5. If not, the routine returns to S1, or if so, a motor current value I is inputted in S6, the current controller is operated in S7, and then the inverter is driven by generating a pulse width modulation signal in S8.

FIG. 5 illustrates a rotation frequency of the sprocket 5 containing a harmonic wave of a pulse component by means of a connecting structure for driving the footplate of the escalator. The harmonic wave of the pulse component is occurs due to the imbalance of the torque generated when the step roller and the groove of the sprocket 5 are engaged to thus be rotated. An analysis thereof using a frequency spectrum is illustrated in FIG. 6.

Namely, if the surface of the sprocket 5 which is interlocked with an upper terminal gear engaged with the induction motor 3 to thus be rotated is positioned at the top, the amplitude is generated at the maximum plus (+) value. If a mountain-shaped portion is positioned at the top by further rotation at a predetermined angle, vibration having the maximum minus (−) value is generated periodically.

Due to the above imbalance of the torque generated when the step roller and the groove of the sprocket 5 are engaged to thus be rotated, a pulse component is also found at the footplate speed of the escalator.

FIG. 7 illustrates the footplate speed of the escalator. The pulse frequency of the footplate speed is determined according to the period during which the step roller is engaged with the groove of the sprocket 5.

In the escalator in accordance with the conventional art, there is a disadvantage that vibration due to the imbalance of the torque is generated when the step roller and the groove of the sprocket are engaged to be thus rotated, which vibration is transmitted to the footplate, thereby degrading the ride comfort.

SUMMARY OF THE INVENTION

Accordingly, it is an object of the present invention to provide an operation control apparatus for an escalator which is capable of outputting a vibration torque compensating current and removing a torque pulse generated at a footplate by using a detector for detecting a pulse rate generated at a sprocket and a device for detecting the magnitude of a pulse torque of an induction motor without changing the circumferential shape of the sprocket and the connecting structure of the footplate.

To achieve the above object, there is provided an operation control apparatus for an escalator in accordance with the present invention which includes: a power rectifier 2 for converting a three-phase AC utility power into an AC power of variable voltage and variable frequency in order to control the operation speed of the escalator; an induction motor 3 which is driven by output power of the power rectifier; a gear 4 and a sprocket for running a footplate using rotatory force generated from the induction motor 3; a current detector 6 for detecting a current flowing in the induction motor 3; an electromagnetic contactor 7 for transmitting the utility power to the power rectifier 2 in an operation mode and interrupting the same in a non-operation mode; a display device 8 for displaying a running condition and failure of the escalator; a passenger detecting device 9 for detecting an access of a passenger intending to use the escalator; a speed detector 21A for detecting the rotational speed of the induction motor 3; a position detection 21B for detecting the rotational position of the sprocket 5; and a control device 60 which drives the power rectifier 2 by obtaining a vibration torque compensating current from an output signal of the speed detector 21A and the position detector 21B, adding the above current to an output current of a speed controller, subtracting an actual current detection value of the induction motor 3 from the resultant current value, and accordingly generating a pulse width modulation signal.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 8:
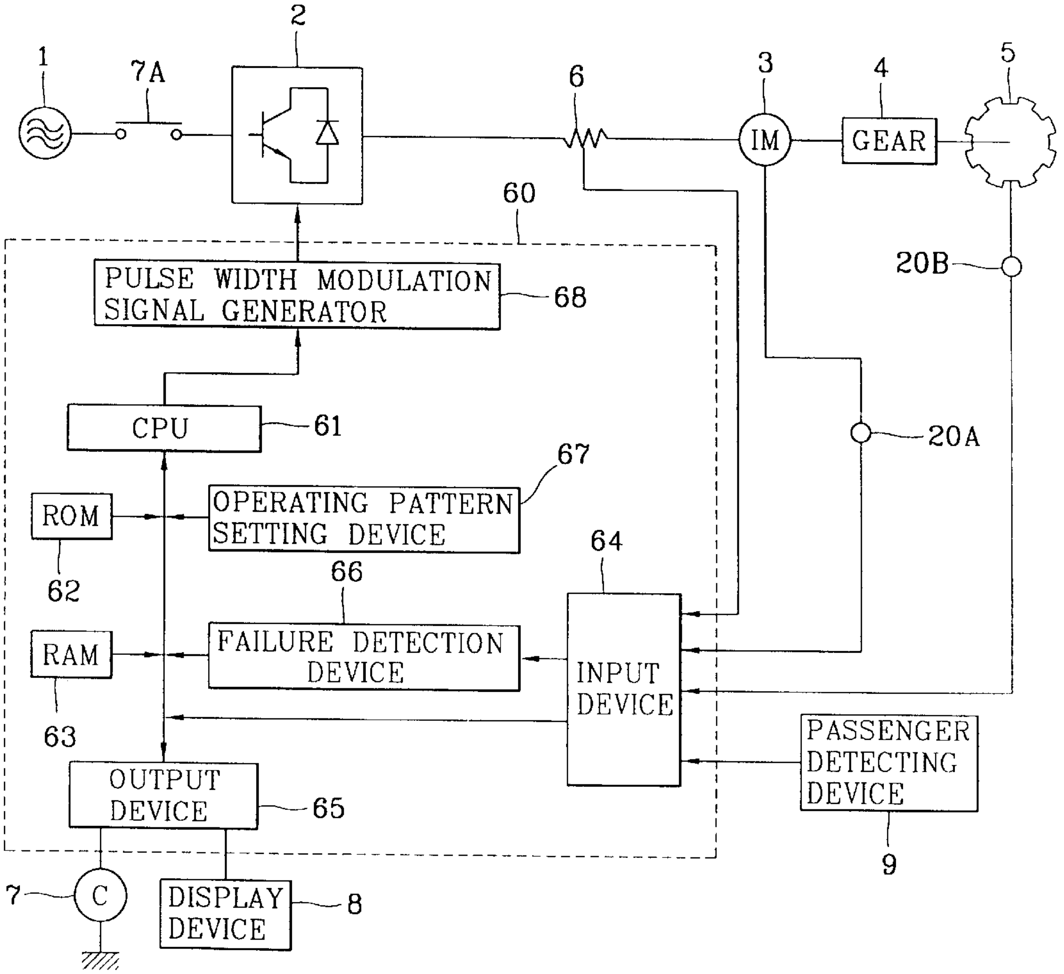
FIG. 8 is a block diagram of an operation control apparatus for an escalator in accordance with the present invention.

FIG. 8 is an exemplary block diagram of an operation control apparatus for an elevator in accordance with a first embodiment of the present invention in order to achieve the object of the present invention. As illustrated therein, the operation control apparatus for an escalator in accordance with the present invention which includes: a power rectifier 2 for converting a three-phase AC utility power into an AC power of variable voltage and variable frequency in order to control the operation speed of the escalator; an induction motor 3 which is driven by output power of the power rectifier; a gear 4 and a sprocket for running a footplate using rotatory force generated from the induction motor 3; a current detector 6 for detecting a current flowing in the induction motor 3; an electromagnetic contactor 7 for transmitting the utility power to the power rectifier 2 in an operation mode and interrupting the same in a non-operation mode; a display device 8 for displaying a running condition and failure of the escalator; a passenger detecting device 9 for detecting an access of a passenger intending to use the escalator; a speed detector 21A for detecting the rotational speed of the induction motor 3; a position detection 21B for detecting the rotational position of the sprocket 5; and a control device 60 which drives the power rectifier 2 by obtaining a vibration torque compensating current from an output signal of the speed detector 21A and the position detector 21B, adding the above current to an output current of a speed controller, subtracting an actual current detection value of the induction motor 3 from the resultant current value, and accordingly generating a pulse width modulation signal.

The control device 60 includes: a CPU 61 for adding the vibration torque compensating current of the induction motor 3 and the output current of the speed controller, subtracting the actual current detection value from the resultant current value and accordingly controlling the pulse width modulation signal, in performing an operation for driving the induction motor 3 at a variable voltage and variable frequency according to a program stored in a ROM 12; a RAM 63 in which data needed in the CPU 61 is stored; an input device 64 for a signal inputted from the current detector 6, the speed detector 21A, the position detector 21B and the passenger detecting device 9 into a form appropriate for the control device 60; an output device 65 for driving the display device 8 and the electromagnetic contactor 7 under the control of the CPU 61; a failure detection judging device 66 for detecting a failure on the basis of an output signal of the input device 64 and an operation pattern setting device 67 for setting a subsequent operation pattern; a pulse width modulation signal generator 68 for generating a pulse width modulation signal so that a pulse torque is offset under the control of the CPU 61 in generating a pulse width modulation signal according to a signal of the CPU 61 in order to generate an AC power of target form from the power rectifier 2.

Figure 9:
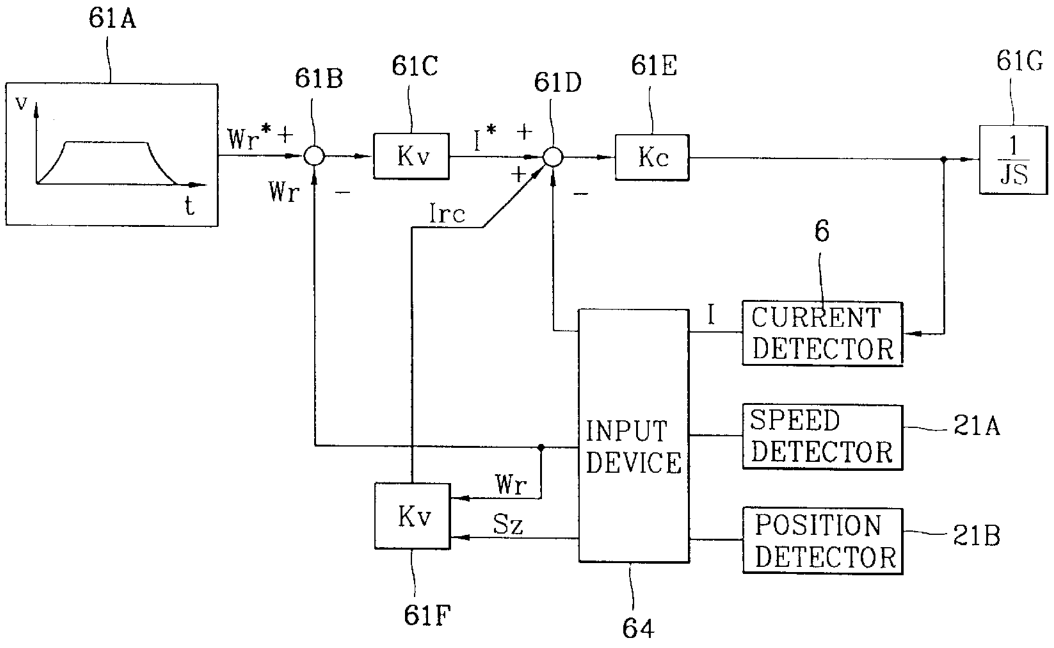
FIG. 9 is an operational block diagram of a control process of an inverter in accordance with the present invention.

FIG. 9 is an operational block diagram of the CPU 61's control process of the inverter of the power rectifier 2 according to the program stored in the ROM 62. As illustrated therein, the CPU 61 includes: a subtractor 61B for subtracting an actually detected speed value Wr of the induction motor 3 from a speed command value Wr* of a speed command unit 61A; a speed controller 61C for generating an output current I* by operationally amplifying an output current of the subtractor 61B for thereby generating an output current I*; a subtractor 61D for obtaining the difference between the output current I* of the speed controller 61C and the output current of the current detector 6 and thereafter adding an output current Irc of a vibration damping controller 61F (to be discussed later) to the resultant current value; a current controller 61E for operationally amplifying the output current of the subtractor 61D; an input device 64 for amplifying a signal inputted from the current detector 6, the speed detector 21A and the position detector 21B to a relevant level; a vibration damping controller 61F for generating a vibration torque compensating current Irc in order to generate a torque in the direction opposite to an actual vibration torque according to the rotational speed Wr of the speed detector 21A and the position detection signal Sz of the position detector 21B supplied by the input device 64.

The operation of the present invention thusly constructed will be described in detail with reference to FIGS. 9 and 10.

When a passenger intending to use the escalator approaches to the entry of the escalator in a state in which the operation of the escalator is stopped, the approach is detected by the passenger detection device 9 and a signal thereof is inputted into the input device 64 of the control device 60. At this time, the CPU 61 performs the operation for driving the induction motor 3 at a variable voltage and variable frequency and operates the electromagnetic contactor 7 according to the program stored in the ROM 62. According to this, an a contact switch 7A of the electromagnetic contactor 7 is short-circuited and thus the three-phase AC utility power 1 is inputted into the power rectifier 2.

In addition, the pulse width modulation signal generator 68 generates a pulse width modulation signal corresponding to the operation result of the CPU 61, and accordingly the power rectifier 2 converts the three-phase AC utility power 1 supplied by the a contact switch 7A into a DC voltage and then generates an AC of variable voltage and variable frequency in order to control the torque corresponding to the target speed and load of the induction motor 3, whereby the induction motor 3 is rotated at the corresponding speed. The rotatory force of the induction motor 3 is transmitted to the sprocket 5 through the gear 4 and the chain, and thus the groove positioned on the circumference of the sprocket 5 and the step roller of the footplate are engaged to thereby be rotated.

Meanwhile, FIG. 9 is an operational block diagram of a process of controlling the inverter of the power rectifier 2 according to the program stored in the ROM 61 of the control device 60 by means of the CPU 61 of the control device 60. The operation of the CPU 61 will be described as follows.

The current detector 6 detects a current flowing in the induction motor 3 and supplies it to a first input of the input device 64, the speed detector 21A generates a pulse corresponding to the rotational speed of the induction motor 3 and supplies it to a second input of the input device 64, the position detector 21B generates pulse signals of the number corresponding to the rotational speed of the sprocket 5 and supplies it to a second input of the input device 64, and the input device 64 outputs each input signal by amplifying it to a relevant level. For reference, the speed detector 21A and the position detector 21B are easily implemented by using a device such as a rotary encoder.

The current detected by the current detector 6 is supplied to a fourth input of the subtractor 61D through the input device 64, and the rotational speed Wr of the induction motor 3 detected by the speed detector 21A is supplied to the other input of the subtractor 61B. At this time, the vibration damping controller 61F generates a vibration torque compensating current Irc in order to generate a torque in the direction opposite to an actual vibration torque according to the rotational speed Wr and the position detection signal Sz outputted from the input device 64. Accordingly, the difference between the speed command value Wr* of the speed command unit 61A and the actual speed value Wr detected by the speed detector 21A is obtained by the subtractor 61B and then is inputted to the speed controller 61C.

The subtractor 61D obtains the difference between the output current I* of the speed controller 61C and the output current of the current detector 6 supplied by the input device 64, and then adds the output current Irc of the vibration damping controller 61F to the resultant current value and outputs the subsequent current value. As a result, a current command compensated for damping vibration is outputted from the subtractor 61D.

The output current of the subtracter 61D is inputted to the current controller 61E, wherein the inverter of the power rectifier 2 is driven by an output value amplified by a predetermined operational process.

Figure 10:
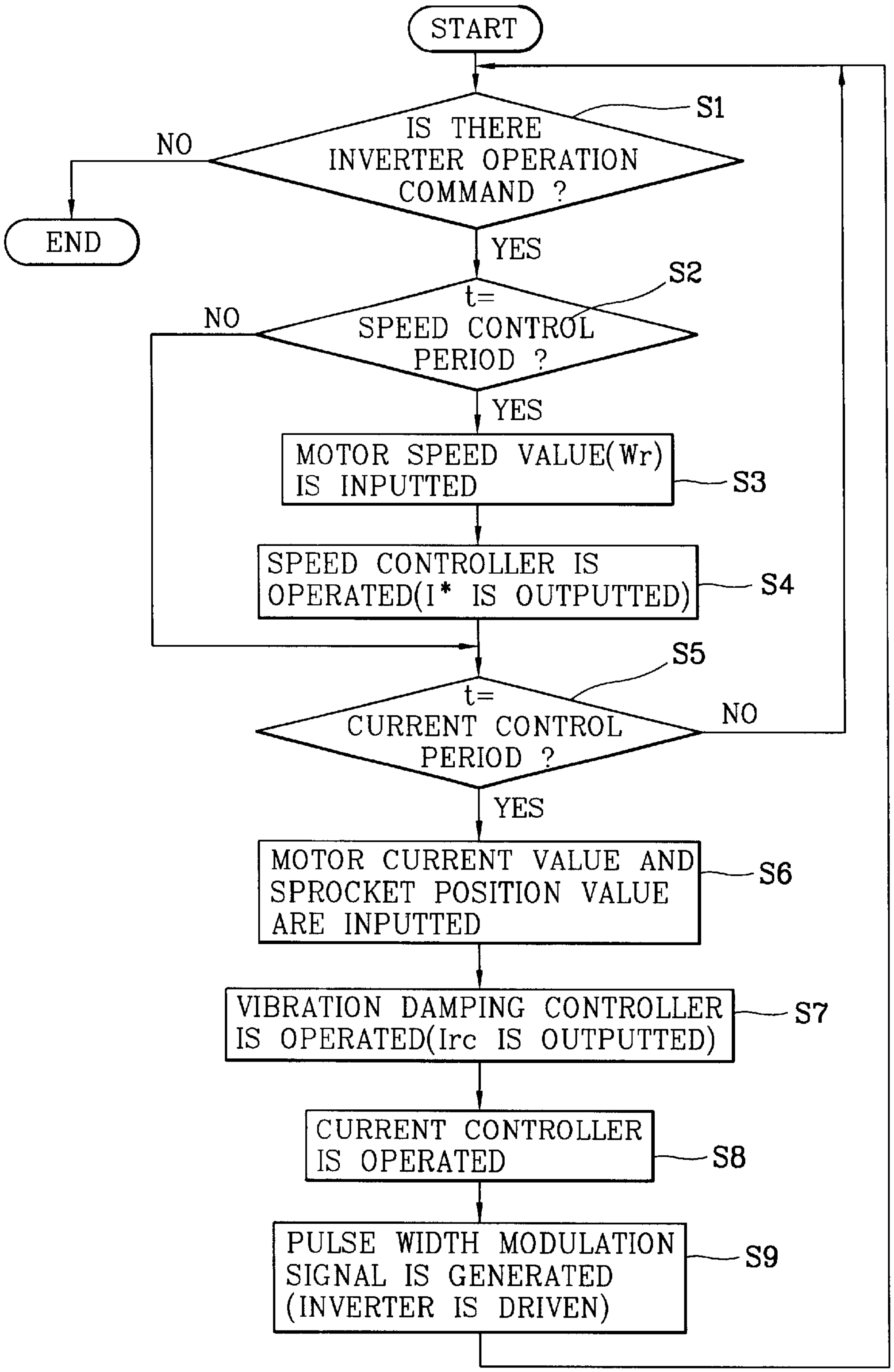
FIG. 10 is a signal flow chart illustrating a control process of an inverter of a power rectifier in accordance with the present invention.

FIG. 10 is a signal flow chart of a control process of the inverter of the power rectifier implementing the vibration damping controller, a detailed description thereof is as follows.

First, it is determined whether or not there is an inverter operation command in S1. If there is an operation command, it is determined whether or not t is a speed control period in S2. If so, a motor speed value Wr is inputted in S3, a speed controller is operated in S4, and then it is determined whether or not t is a current control period in S5. Meanwhile, if there is no operation command in S1, the routine is terminated. In addition, if t is not a current control period in S4, the routine returns to S5. It is determined whether or not t is a current control period in S5. If not, the routine returns to S1, or if so, a motor current value I and a sprocket position value are inputted in S6, the vibration damping controller is operated in S7, the current controller is operated in S8, and then the inverter is driven by generating a pulse width modulation signal in S9.

Figure 11:
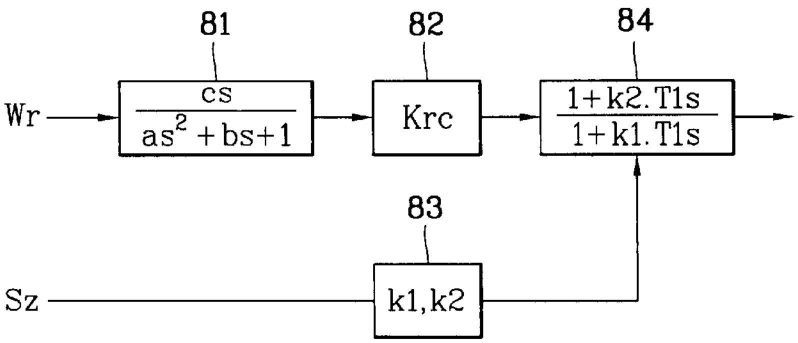
FIG. 11 is a detailed block diagram of a vibration damping controller of FIG. 7.
Figure 12:
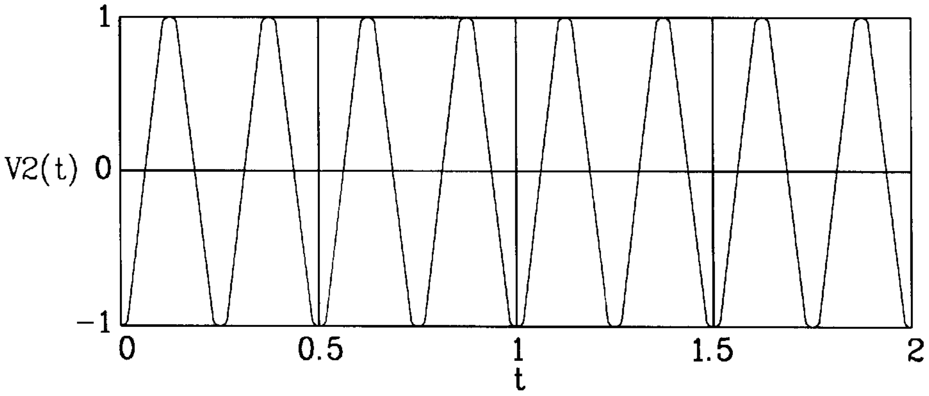
FIG. 12 is a waveform view of a torque of an oscillating component of a sprocket.
Figure 13:
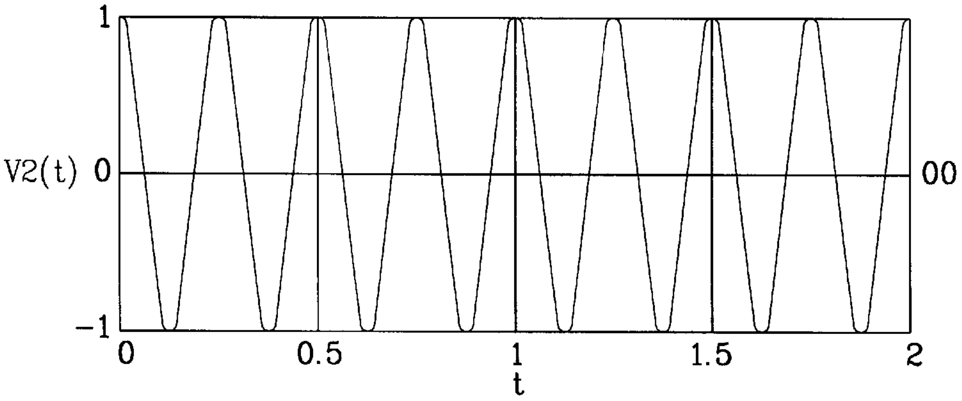
FIG. 13 is a waveform view of a compensating torque of a vibration damping controller.

Meanwhile, FIG. 11 is a detailed block diagram illustrating the vibration damping controller 61F in accordance with the first embodiment of the present invention. The operation of the vibration damping controller 61F will now be described in detail with reference to FIG. 11.

A band-pass filter 81 extracts a pulse component from the rotational speed signal Wr of the induction motor 3 detected by the speed detector 21A, and a pulse torque controller 82 appropriately controls the detected pulse component. In addition, a phase integer setting unit 83 synchronizes the position detection signal Sz detected by the position detector 21B with a pulse torque to thereby output the signal. A phase compensator 84 generates a vibration torque compensating current Irc in order to generate a torque in the direction opposite to the actual vibration torque according to the output signal of the pulse torque controller 82 and the output signal of the phase integer setting unit 83.

Namely, the band-pass filter 81 extracts a pulse component of the same frequency as in FIG. 9 by band-pass filtering the rotational speed signal Wr, and the transfer function of the band-pass filter 81 is expressed by the following mathematical formula 1.

[Mathematical Formula 1]

$$G1(s) = \frac{cs}{as^2 + bs + 1},$$

wherein, a, b and c are filter integers, and s is a Laplacian.

The pulse component outputted from the band-pass filter 81 is converted to a signal having the same size as the output signal of the speed controller 61C by the pulse torque controller 82, and then is inputted to the phase compensator 84. The transfer function of the phase compensator 84 is expressed by the following mathematical formula 2.

[Mathematical Formula]

$$G2(S) = \frac{1 + K_2{}^*T_1{}^{**}S}{1 + K_1{}^*T_1{}^*S},$$

wherein, K1 and K2 are integers of the phase compensator 84, T1 is a control operation period, and S is a Laplacian.

The phase integer setting unit 83 determines the integers K1 and K2 by operating the position at which the sprocket 5 and the step roller meet according to the output signal of the position detector 21B, and outputs the integers k1 and K2 to the phase compensator 84. The output current Irc of the phase compensator 84 is outputted in the form as in FIG. 10. By this, it can be known that the output current Irc has a pulse signal and a phase opposite to those of FIG. 9, but has the same size as in FIG. 9.

Resultantly, the vibration torque compensating current Irc outputted from the phase compensator 84 and the output current I* of the speed controller 61C are added, the actual current detection value of the induction motor 3 supplied by the input device 64 is subtracted from the resultant current value and then is inputted to the current controller 61E, and the pulse width modulation signal generator 68 generates a pulse width modulation signal according to the output signal of the current controller 61E to thus drive the power rectifier 2, whereby a torque current offsetting the pulse torque flows in the induction motor 3, thereby suppressing vibration.

Figure 1:
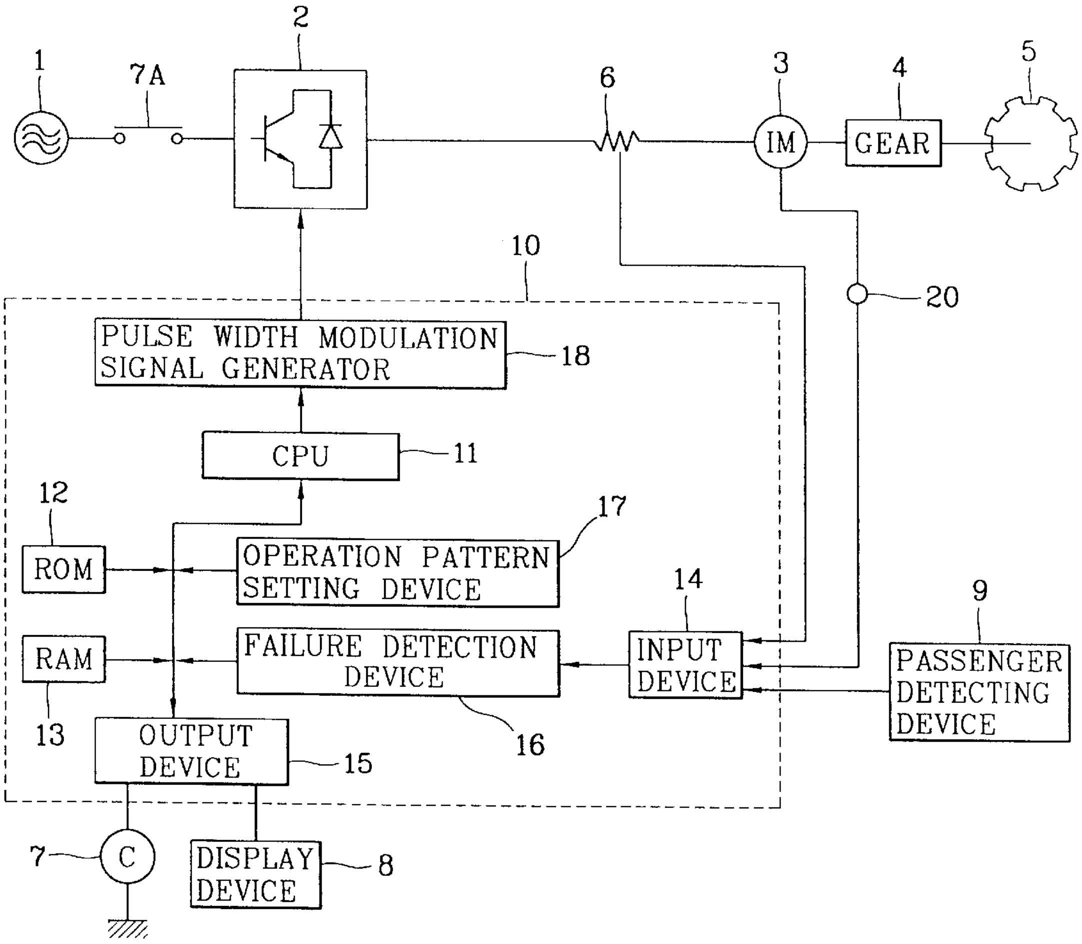
FIG. 1 CONVENTIONAL ART
FIG. 1 is a block diagram of an operation control apparatus for an escalator in accordance with the conventional art.
Figure 2:
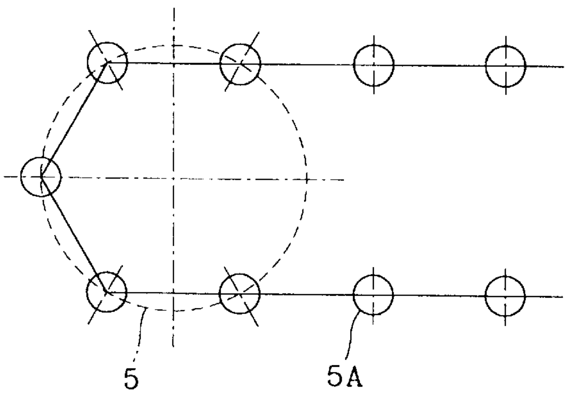
FIG. 2 CONVENTIONAL ART
FIG. 2 is a block diagram of a connection between a sprocket and a chain.
Figure 3:
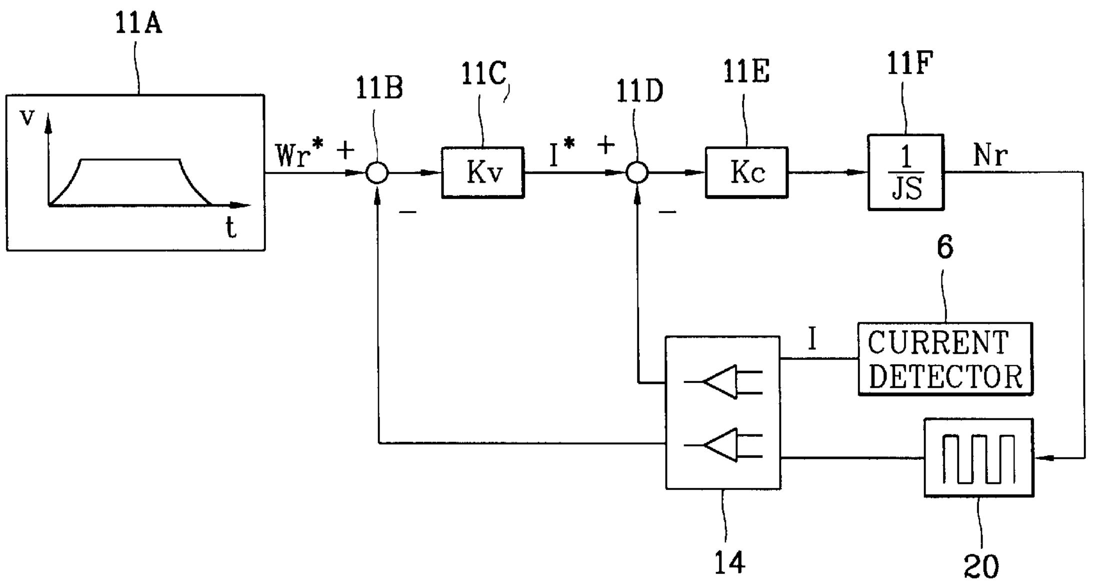
FIG. 3 CONVENTIONAL ART
FIG. 3 is a operational block diagram illustrating a control process of an inverter by means of a control apparatus of FIG. 1.
Figure 4:
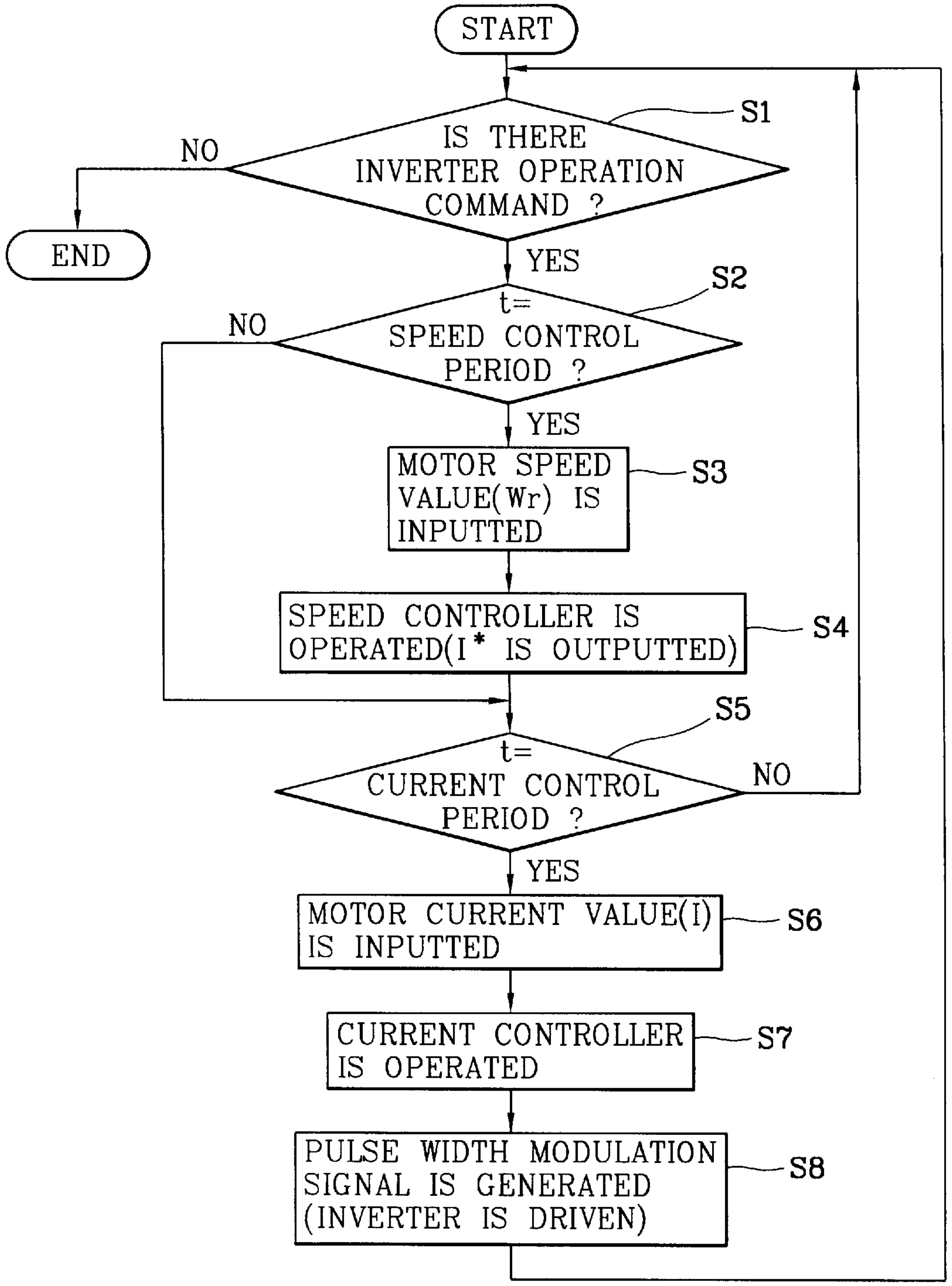
FIG. 4 CONVENTIONAL ART
FIG. 4 is a signal flow chart illustrating a control process of an inverter of a power rectifier in accordance with the conventional art.
Figure 5:
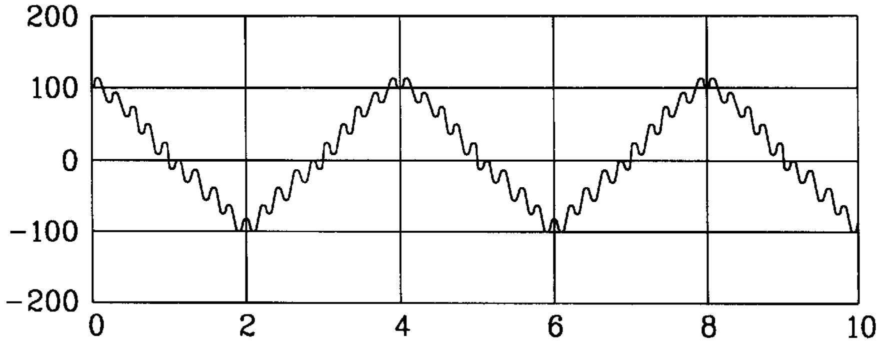
FIG. 5 CONVENTIONAL ART
FIG. 5 is a waveform view of a rotational frequency of a sprocket in accordance with the conventional art.
Figure 6:
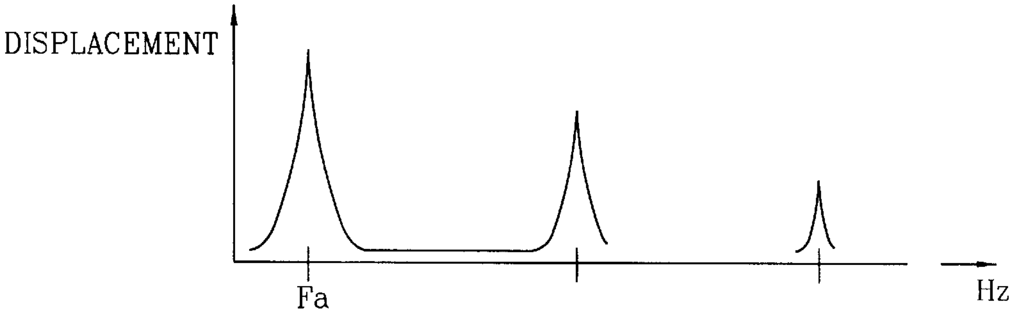
FIG. 6 CONVENTIONAL ART
FIG. 6 is a vibrational spectrum of a sprocket in accordance with the conventional art.
Figure 7:
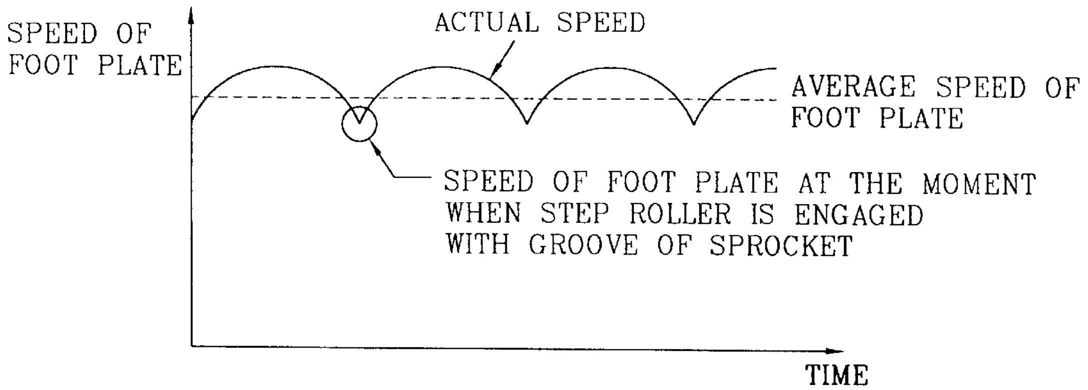
FIG. 7 CONVENTIONAL ART
FIG. 7 is a waveform view illustrating the footplate speed of an escalator in accordance with the conventional art.

In addition, in order to achieve the above effect, a footplate speed pulse component of the escalator can be removed by using a footplate speed pulse compensator. As described above, the footplate speed of the escalator has the same pulse component as in FIG. 7 due to the imbalance of the torque generated when the step roller and the groove of the sprocket 5 are engaged to thus be rotated. Thus, if the speed command value of the escalator compensates for the pulse component, the pulse component generated when the step roller and the groove of the sprocket 5 are engaged disappears from the actual footplate speed of the escalator.

Figure 14:
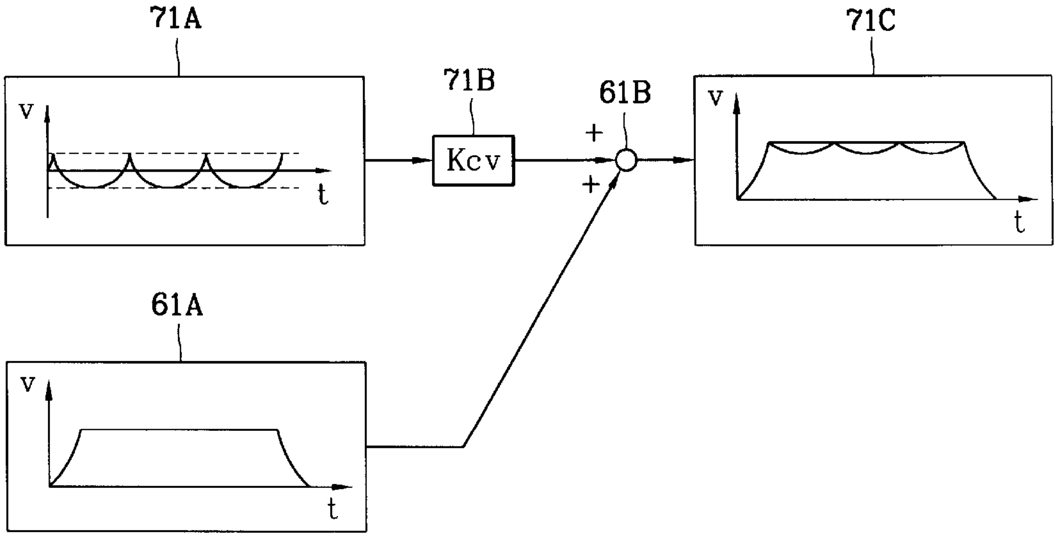
FIG. 14 is a generation block diagram of a speed compensating command value in accordance with the present invention.

FIG. 14 is a block diagram for generating a speed compensating command value 71C in order to compensate for the pulse component of the footplate speed of the escalator. The period and time during which the step roller and the groove of the sprocket are engaged are detected by the output signal of the sprocket position detector 21B of FIG. 8 to thus generate a pulse component compensating value 71A having a pulse component and phase of the escalator opposite to those of FIG. 7, an unit size, and the same time and period during which the step roller and the groove of the sprocket are engaged as in FIG. 7, thereby generating a speed compensating command value 71C by adding a value having a footplate pulse component and a conventional speed command value 61A. When the speed of the escalator is controlled by using the speed compensating command value 71C, the pulse component of the footplate speed of the escalator is removed.

Figure 15:
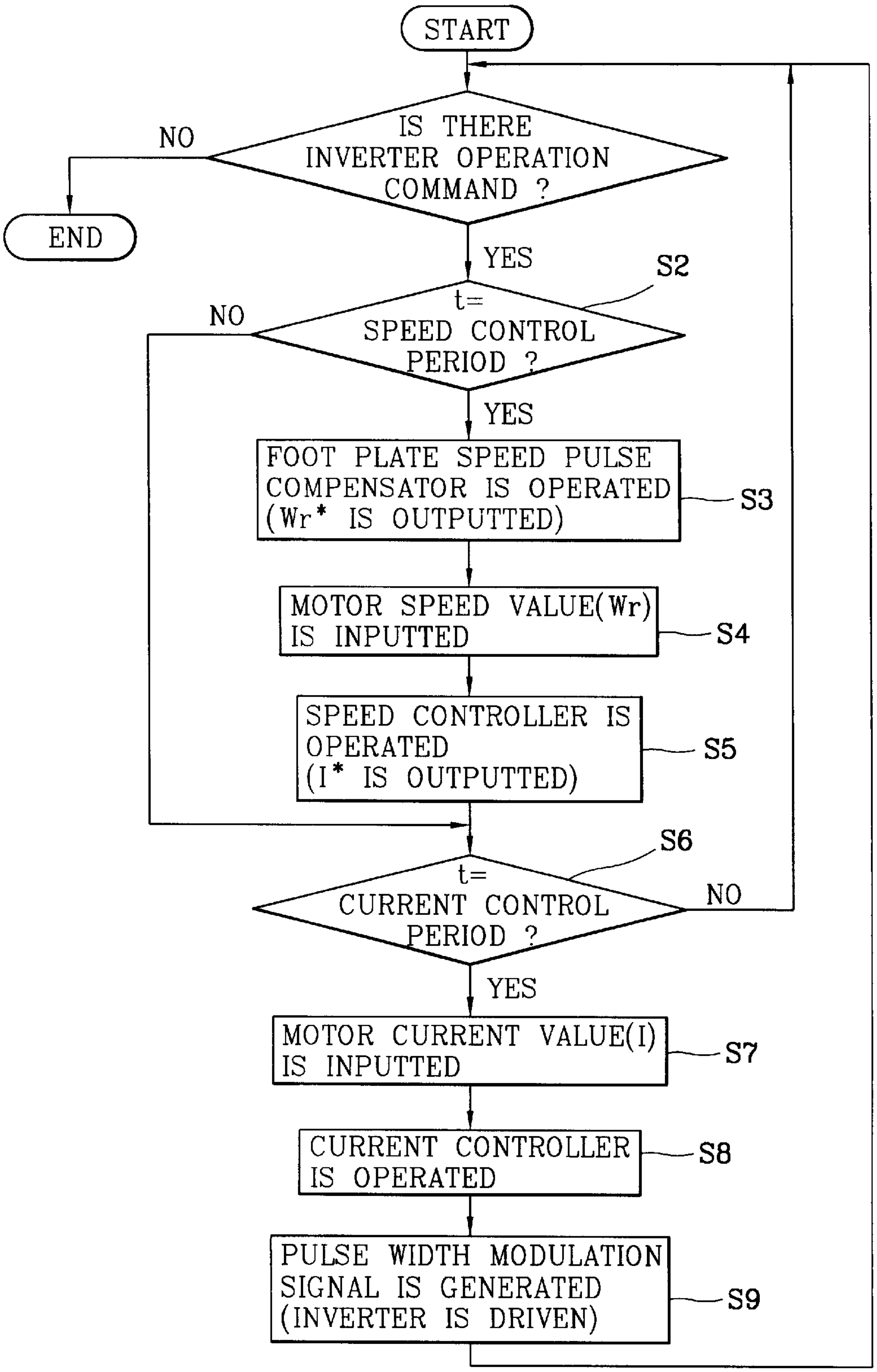
FIG. 15 is a signal flow chart with respect to a method for using a footplate pulse compensator in accordance with the present invention.

FIG. 15 is signal flow chart with respect to a method of using the footplate speed pulse compensator, which will be described in detail as follows.

First, it is determined whether or not there is an inverter operation command in S1. If there is an operation command, it is determined whether or not t is a speed control period in S2. If so, the footplate speed pulse compensator is operated in S3, a motor speed value Wr is inputted in S4, a speed controller is operated in S5, and then it is determined whether or not t is a current control period in S6. Meanwhile, if there is no operation command in S1, the routine is terminated. In addition, if t is not a current control period in S2, the routine returns to S6. It is determined whether or not t is a current control period in S6. If not, the routine returns to S1, or if so, a motor current value I is inputted in S7, the current controller is operated in S8, and then the inverter is driven by generating a pulse width modulation signal in S9.

As explained above, in the present invention, there is an advantage of outputting a vibration torque compensating current and removing a torque pulse generated at the footplate by using a detector for detecting a pulse rate generated at a sprocket and a device for detecting the magnitude of a pulse torque of an induction motor without changing the circumferential shape of the sprocket and the connecting structure of the footplate, thereby improving the ride comfort of the escalator.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a control apparatus for an escalator comprising:

a power rectifier for converting a three-phase AC utility power into an AC power of variable voltage and variable frequency in order to control the operation speed of the escalator, a gear and a sprocket for running a footplate using rotatory force generated from the induction motor, and a current detector for detecting a current flowing in the induction motor, to an operation control apparatus for an escalator, comprising:

a speed detector for detecting the rotational speed of the induction motor;

a position detector for detecting the rotational position of the sprocket; and a control device which drives the power rectifier by obtaining a vibration torque compensating current from an output signal of the speed detector and the position detector, adding the above current to an output current of a speed controller, subtracting an actual current detection value of the induction motor from the resultant current value, and accordingly generating a pulse width modulation signal.

2. The apparatus of claim 1, wherein the control device comprises:

a CPU for adding the vibration torque compensating current of the induction motor and the output current of the speed controller, subtracting the actual current detection value from the resultant current value and accordingly controlling the pulse width modulation signal, in performing an operation for driving the induction motor at a variable voltage and variable frequency according to a program stored in a ROM;

a RAM in which data needed in the CPU is stored;

an input device for a signal inputted from the current detector, the speed detector, the position detector and the passenger detecting device into a form appropriate for the control device;

an output device for driving the display device and the electromagnetic contactor under the control of the CPU;

a failure detection judging device for detecting a failure on the basis of an output signal of the input device and an operation pattern setting device for setting a subsequent operation pattern; and a pulse width modulation signal generator for generating a pulse width modulation signal so that a pulse torque is offset under the control of the CPU in generating a pulse width modulation signal according to a signal of the CPU in order to generate an AC power of target form from the power rectifier.

3. The apparatus of claim 2, wherein the CPU comprises:

a subtractor for subtracting an actually detected speed value Wr of the induction motor from a speed command value Wr* of a speed command unit;

a speed controller for generating an output current I* by operationally amplifying an output current of the subtractor for thereby generating an output current I*;

a subtractor for obtaining the difference between the output current I* of the speed controller and the output current of the current detector and thereafter adding an output current Irc of a vibration damping controller to the resultant current value;

a current controller for operationally amplifying the output current of the subtractor;

an input device for amplifying a signal inputted from the current detector, the speed detector and the position detector to a relevant level; and a vibration damping controller for generating a vibration torque compensating current Irc in order to generate a torque in the direction opposite to an actual vibration torque according to the rotational speed Wr of the speed detector and the position detection signal Sz of the position detector supplied by the input device.

4. In a control apparatus for an escalator comprising:

a power rectifier for converting a three-phase AC utility power into an AC power of variable voltage and variable frequency in order to control the operation speed of the escalator;

a gear and a sprocket for running a footplate using rotatory force generated from the induction motor; and a current detector for detecting a current flowing in the induction motor, an operation control apparatus for an escalator, comprising:

a speed detector for detecting the rotational speed of the induction motor;

a position detector for detecting the rotational position of the sprocket; and a control device which drives the power rectifier by obtaining a vibration torque compensating current from an output signal of the speed detector and the position detector, adding the above current to an output current of a speed controller, subtracting an actual current detection value of the induction motor from the resultant current value, and accordingly generating a pulse width modulation signal, a passenger detecting device for detecting an access of a passenger intending to use the escalator.

5. The apparatus of claim 4, wherein the control device comprises:

a CPU for adding the vibration torque compensating current of the induction motor and the output current of the speed controller, subtracting the actual current detection value from the resultant current value and accordingly controlling the pulse width modulation signal, in performing an operation for driving the induction motor at a variable voltage and variable frequency according to a program stored in a ROM;

a RAM in which data needed in the CPU is stored;

an input device for a signal inputted from the current detector, the speed detector, the position detector and the passenger detecting device into a form appropriate for the control device;

an output device for driving the display device and the electromagnetic contactor under the control of the CPU;

a failure detection device for detecting a failure on the basis of an output signal of the input device and an operation pattern setting device for setting a subsequent operation pattern; and a pulse width modulation signal generator for generating a pulse width modulation signal so that a pulse torque is offset under the control of the CPU in generating a pulse width modulation signal according to a signal of the CPU in order to generate an AC power of target form from the power rectifier.

6. The apparatus of claim 4, wherein the control device further comprises:

a subtractor for subtracting an actually detected speed value Wr of the induction motor from a speed command value Wr* of a speed command unit; and a speed controller for generating an output current I* by operationally amplifying an output current of the subtractor for thereby generating an output current I*.

7. In a control apparatus for an escalator comprising:

a power rectifier for converting a three-phase AC utility power into an AC power of variable voltage and variable frequency in order to control the operation speed of the escalator;

a gear and a sprocket for running a footplate using rotatory force generated from the induction motor; and a current detector for detecting a current flowing in the induction motor, an operation control apparatus for an escalator, comprising:

a subtractor for obtaining the difference between the output current I* of the speed controller and the output current of the current detector and thereafter adding an output current Irc of a vibration damping controller to the resultant current value;

a current controller for operationally amplifying the output current of the subtractor; and a vibration damping controller for generating a vibration torque compensating current Irc in order to generate a torque in the direction opposite to an actual vibration torque according to the rotational speed Wr of the speed detector and the position detection signal Sz of the position detector supplied by the input device.

8. The apparatus of claim 7, wherein the vibration damping controller comprises:

a band-pass filter for extracting a pulse component from the rotational speed signal Wr of the induction motor detected by the speed detector;

a pulse torque controller for appropriately controlling the detected pulse component;

a phase integer setting unit for synchronizing the position detection signal Sz detected by the position detector with a pulse torque to thereby output the signal; and a phase compensator for generating a vibration torque compensating current Irc in order to generate a torque in the direction opposite to the actual vibration torque according to the output signal of the pulse torque controller and the output signal of the phase integer setting unit.

9. In a control apparatus for an escalator comprising:

a power rectifier for converting a three-phase AC utility power into an AC power of variable voltage and variable frequency in order to control the operation speed of the escalator;

a gear and a sprocket for running a footplate using rotatory force generated from the induction motor; and a current detector for detecting a current flowing in the induction motor, an operation control apparatus for an escalator, comprising:

a speed detector for detecting the rotational speed of the induction motor;

a position detector for detecting the rotational position of the sprocket; and a control device which drives the power rectifier by obtaining a pulse component compensating content of the footplate speed of the escalator from an output signal of the position detector, adding a speed command value of the escalator to the above value, subtracting an actual speed of the induction motor from the resultant current value, and accordingly generating a pulse width modulation signal.

10. The apparatus of claim 9, wherein the control device comprises:

a CPU for adding the vibration torque compensating current of the induction motor and the output current of the speed controller, subtracting the actual current detection value from the resultant current value and accordingly controlling the pulse width modulation signal, in performing an operation for driving the induction motor at a variable voltage and variable frequency according to a program stored in a ROM;

a RAM in which data needed in the CPU is stored;

an input device for a signal inputted from the current detector, the speed detector, the position detector and the passenger detecting device into a form appropriate for the control device;

an output device for driving the display device and the electromagnetic contactor under the control of the CPU;

a failure detection device for detecting a failure on the basis of an output signal of the input device and an operation pattern setting device for setting a subsequent operation pattern; and a pulse width modulation signal generator for generating a pulse width modulation signal so that a pulse torque is offset under the control of the CPU in generating a pulse width modulation signal according to a signal of the CPU in order to generate an AC power of target form from the power rectifier.

* * * * *